US006691152B1

United States Patent
Moride et al.

(10) Patent No.: US 6,691,152 B1
(45) Date of Patent: Feb. 10, 2004

(54) INFORMATION RECEIVING APPARATUS CAPABLE OF INFORMING RECIPIENT PIECES OF INFORMATION HAVING DIFFERENT ATTRIBUTES AND A COMPUTER READABLE RECORDING MEDIUM ON WHICH INFORMATION RECEIVING PROGRAM IS RECORDED

(75) Inventors: Shigeki Moride, Kanagawa (JP); Mitsuru Osawa, Kanagawa (JP); Toru Ohashi, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/520,198

(22) Filed: Mar. 7, 2000

(30) Foreign Application Priority Data

Aug. 10, 1999 (JP) .......................................... 11-226462

(51) Int. Cl.[7] .............................................. G06F 15/16

(52) U.S. Cl. ..................................................... 709/203
(58) Field of Search ................................ 709/203, 204

(56) References Cited

U.S. PATENT DOCUMENTS 5,745,758 A * 4/1998 Shaw et al. ................. 709/102
5,996,003 A * 11/1999 Namikata et al. ........... 709/205

* cited by examiner

Primary Examiner—David Y. Eng
(74) Attorney, Agent, or Firm—Greer, Burns & Crain, Ltd.

(57) ABSTRACT

Pieces of information having different attributes are informed to a recipient. An information receiving apparatus includes receiving channel control units for respectively receiving pieces of article information respectively allocated to a plurality of transmission channels and having different attributes in units of channels, a display, and display control unit for displaying the pieces of article information respectively received by the receiving channel control units on the display.

7 Claims, 14 Drawing Sheets

INFORMATION RECEIVING APPARATUS CAPABLE OF INFORMING RECIPIENT PIECES OF INFORMATION HAVING DIFFERENT ATTRIBUTES AND A COMPUTER READABLE RECORDING MEDIUM ON WHICH INFORMATION RECEIVING PROGRAM IS RECORDED

FIELD OF THE INVENTION

The present invention relates to an information receiving apparatus which informs the information to a recipient and to a computer readable recording medium on which an information receiving program is recorded. More particularly the invention relates to an information receiving apparatus being capable of reliably informing a recipient of pieces of information having different attributes and a computer readable recording medium on which an information receiving program is recorded.

BACKGROUND OF THE INVENTION

In recent years, in an enterprise, an education organization, or the like, with development of a LAN (Local Area Network) or an intranet, in place of a primitive means such as conventional circulation of a sheet of paper or oral communication of information, information sharing using bulletin board systems by groupware or electronic media such as electronic mails has been popularized. These bulletin board systems or electronic mails have advantages that information can be received at an arbitrary timing by a recipient. However, on the another hand, in emergency, these bulletin board systems or electronic mails may have a drawback that the recipient is to reliably informed of the information. For this reason, in prior art, a means and a method which can cancel the drawback is earnestly desired.

In an enterprise or the like, a network environment such as a LAN or an intranet is prepared, and information is informed (shared or transmitted) by a client/server system consisting of clients and servers connected to each other through the network. Each server is installed on the originator side, holds information on a bulletin board system or holds information as an electronic mail. On the other hand, each client is installed on the recipient side, and accesses the server to refer to information held in the servers.

More specifically, in the client, after software for a bulletin board system or electronic software is started, the server is accessed through the network to refer to the information on the bulletin board system or receive an electronic mail (information). At this time, the recipient checks the contents of the information on the bulletin board system or in the electronic mail displayed on a display. In this manner, in the conventional client/server system, information from an originator cannot be transmitted and shared until the recipient performs an action (start of software for a bulletin board system or the like). Thus, this is a system in which depends completely on the recipient.

As described above, since the conventional client/server system is a system in which depends completely on the recipient, the following drawback occurs. That is, even if an originator holds the information in a server to transmit or share the information, the information of the server is not informed to the recipient until the recipient performs some action. When the information is the information regarding an emergency, or when the information is an important information, the drawback is serious.

In the prior art, since the information of a bulletin board system and the information of an electronic mail have different attributes, programs (a software program for a bulletin board system and an electronic mail program) coping with the attributes must be independently started. Therefore, in order to inform a recipient of pieces of information having different attributes, a very cumbersome operation that the plurality of programs are operated must be performed. For this reason, it is very difficult to reliably inform the recipient of the pieces of information.

SUMMARY OF THE INVENTION

It is an object of this invention to provide an information receiving apparatus being capable of reliably informing a recipient of pieces of information having different attributes and a computer readable recording medium on which an information receiving program is recorded.

In order to achieve the above object, the information receiving apparatus according to one aspect of the present invention comprises a plurality of receiving units which receive pieces of information which are respectively allocated to a plurality of transmission channels and have different attributes in units of transmission channels, a display unit and a display control unit which display the pieces of information respectively received by the receiving units in one display region of the display unit.

According to the above invention, when the pieces of information having different attributes are received by the plurality of receiving units in units of transmission channels, the display control unit displays the received pieces of information having different attributes in one display region of the display unit.

Thus, the receiving units for respectively receiving the received pieces of information having different attributes are provided, and the received pieces of information are displayed in one display region at once. Therefore, unlike the prior art, since a dedicated program need not be started for, every attribute, the pieces of information having different attributes can be more reliably informed to the recipient.

Further, a selection unit for selecting arbitrary information to bed displayed of the pieces of information respectively received by the receiving units in accordance with a predetermined order of priority is provided, and the display control unit displays the arbitrary information selected by the selection unit in one display region of the display unit.

According to the above invention, when the arbitrary information to be displayed of the received pieces of information is selected by the selection unit, and the display control unit displays the selected arbitrary information in one display region.

Thus, since the selection unit is provided to select or reject necessary information and unnecessary information for a recipient, necessary information mixed with unnecessary information can be prevented from being overlooked.

Further, the pieces of information respectively allocated to the plurality of transmission channels are a set of pieces of document information, pieces of importance information depending on the degrees of importance are added to the pieces of document information, and the display control unit displays document information having a high degree of importance, on the basis of the importance information, in preference to the other pieces of document information in one region of the display unit.

According to the above invention, when the receiving units receive the pieces of information (pieces of document information) having different, attributes in units of transmission channels, the display control unit displays document information having a high degree of importance in preference to the other pieces of document information in one display region.

Thus, since the pieces of importance information are added to the pieces of document information, and document information having a high degree of importance is displayed in one display region, recipient's attention to the document information having a high degree of importance can be called.

Further, pieces of attached information related to detailed information are added to the pieces of information, and the display control unit displays the pieces of information in the display region and displays the detailed information on the basis of the pieces of attached information.

According to the above invention, since the pieces of attached information are added to the pieces of information to display not only ordinary information but also the detailed information, correct information can be informed to a recipient.

The information receiving apparatus according to another aspect of the present invention comprises a plurality of receiving units which receive pieces of information which are respectively allocated to a plurality of transmission channels and have different attributes in units of transmission channels, a display unit having a plurality of display regions, an allocation unit which arbitrarily allocates the pieces of information respectively received by the receiving units to a plurality of display regions of the display unit, and a display control unit which dispersedly displays the pieces of information in the pieces of display regions of the display unit in accordance with allocation in the allocation unit.

According to the above invention, when the pieces of information having different attributes are received by the receiving units in units of transmission channels, the allocation unit arbitrarily allocates the pieces of information received by the receiving units to the plurality of display regions. In this manner, the display control unit dispersedly displays the received pieces of information having different attributes in the plurality of display regions.

Thus, since the allocation unit is provided to allocate the pieces of information received by the receiving units to the plurality of display regions, and the pieces of information are dispersedly displayed in the plurality of display regions, unlike the prior art, a dedicated program need not be started for every attribute. Therefore, the pieces of information having different attributes can be more reliably informed to a recipient, and a display screen which is easily seen by the recipient can be achieved by dispersedly displaying the pieces of information.

Further, the allocation unit allocates information displayed in a certain display region to another display region again when the pieces of information are dispersedly displayed in the plurality of display regions.

According to the above invention, when reallocation in which information displayed in a certain display region is allocated to another display region is performed by the allocation unit, the display control unit moves the information displayed in the certain display region to another display region.

Thus, since reallocation related to the display regions is performed by the allocation unit, a display screen which is more easily seen by the recipient can be achieved.

Further, an integration unit which combines at least two display regions into one display region when the pieces of information are dispersedly displayed in the plurality of display regions.

According to the above invention, when at least two display regions are combined into one display region by the integration unit, the pieces of information which are respectively displayed in at least two display regions before combination are integrally displayed in the integrated display region.

Thus, since at least two display regions are combined into one display region by the integration unit, the pieces of information which are dispersedly displayed can be combined, and a display area required in the display unit can be reduced.

According to still another aspect of the present invention, a computer readable recording medium is provided on which an information receiving program for causing a computer to execute a receiving step of receiving pieces of information which are respectively allocated to a plurality of transmission channels and have different attributes in units of transmission channels, and a display control step of displaying the pieces of information received in the receiving step in one display region of a display unit is recorded.

According to the above invention, when the pieces of information having different attributes are received in units of transmission channels at the receiving step, the received pieces of information having different attributes are displayed in one display region of the display unit at the display control step.

Thus, since the pieces of information received at the receiving step are displayed in one display region at once, unlike the prior art, a dedicated program need not be started for every attribute. Therefore, the pieces of information having different attributes can be informed to a recipient.

According to still another aspect of the present invention, a computer readable recording medium is provided on which an information receiving program for causing a computer to execute a receiving step of receiving pieces of information which are respectively allocated to a plurality of transmission channels and have different attributes in units of transmission channels, an allocation step of arbitrarily allocating the pieces of information received at the receiving step in a plurality of display regions of a display unit, and a display control step of dispersedly displaying the pieces of information in the plurality of display regions of the display unit in accordance with allocation at the allocation step is recorded.

According to the above invention, when the pieces of information having different attributes are received in units of transmission channels at the receiving step, at the allocation step, the pieces of information received at the receiving step are arbitrarily allocated to the plurality of display regions. In this manner, at the display control step, the received pieces of information having different attributes are dispersedly displayed in the plurality of display regions.

Thus, since the pieces of information received in the receiving step are allocated to the plurality of display regions, and the pieces of information are dispersedly displayed in the plurality of display regions in accordance with the allocation, unlike the prior art, a dedicated program need not be started for every attribute. Therefore, the pieces of information having different attributes can be more reliably informed to a recipient, and a display screen which is easily seen by the recipient can be achieved by dispersedly displaying the pieces of information.

Other objects and features of this invention will become apparent from the following description with reference to the accompanying drawings.

DESCRIPTION OF THE PREFERRED EMBODIMENTS

An embodiment of an information receiving apparatus according to the present invention and a computer readable recording medium, on which an information receiving program is recorded, according to the present invention will be described below with reference to the accompanying drawings.

The outline of the embodiment will be described first with reference to FIG. 1. In the embodiments described later, pieces of information held in a server 10, having different attributes, allocated to a plurality of channels are transmitted to a client 50, and arbitrary information of the pieces of information having different attributes is selectively displayed on the client 50 side, or all the pieces of information are forcibly displayed. More specifically, the embodiment has the following characteristic feature. That is, the pieces of information having different attributes are displayed on the client 50 side without a cumbersome operation such as an operation of independently starting programs corresponding to the attributes.

Figure 1:
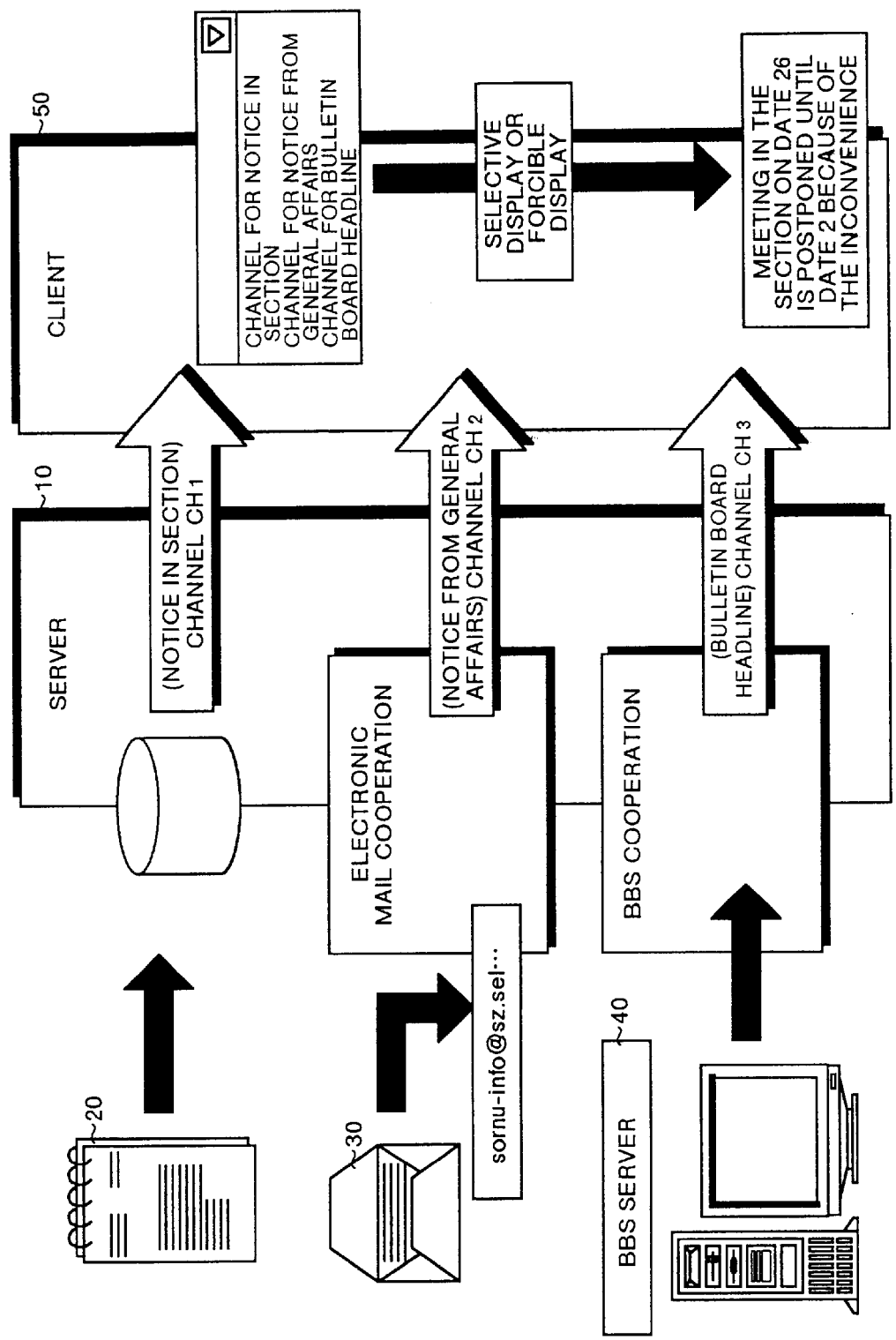
FIG. 1 explains the principals of the present invention.

In FIG. 1, three pieces of information such as document data 20, an electronic mail 30, and BBS information obtained from a BBS server 40 are illustrated as pieces of information having different attributes. The document data 20 has a title "Notice in Section", and is allocated to a channel $CH_1$. The electronic mail 30 has a title "Notice from General Affairs", and is allocated to a channel $CH_2$.

Similarly, the BBS information from the BBS server 40 has a title "Bulletin Board Headline", and is allocated to a channel $CH_3$. When the three pieces of information are transmitted from the server 10 to the client 50, the client 50 selectively displays one piece of information of the three pieces of information, or the client 50 forcibly displays all the three pieces of information.

Figure 2:
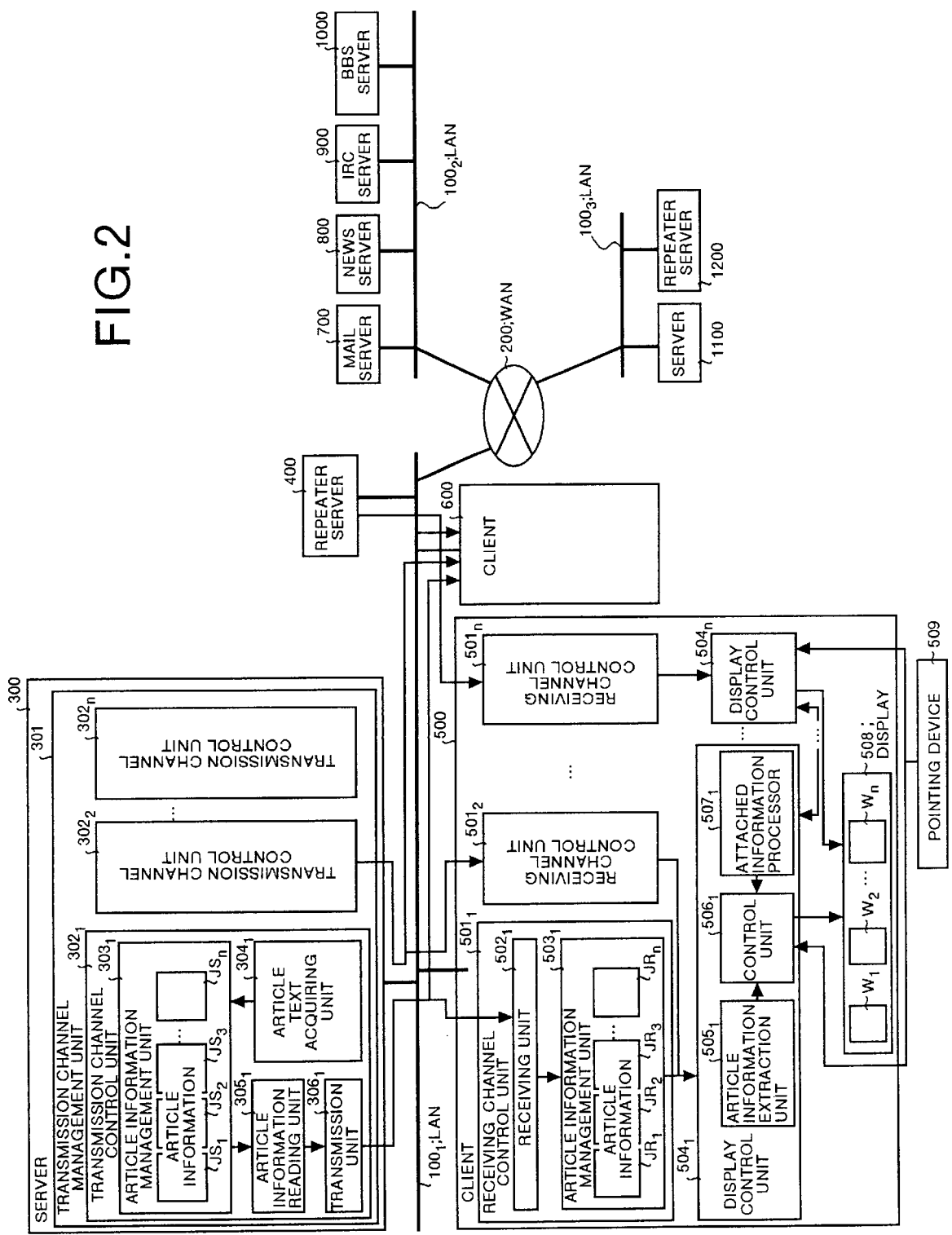
FIG. 2 is a block diagram showing the configuration of the embodiment.

FIG. 2 is a block diagram showing the configuration of one embodiment. A network of a LAN-WAN (Wide Area Network) form is constituted of LANs $1000_1$ to $100_3$ and a WAN 200 for connecting the LANs $100_1$ to $100_3$ to each other. A server 300, a repeater server 400, a client 500, and a client 600 are connected to the LAN $100_1$. The server 300 has a plurality of transmission channels, and has a function of transmitting pieces of article information allocated to the plurality of transmission channels to the client 500 and the client 600. The details of the server 300 will be described later. The article information is the information which is to be transmitted to the client 500 and the client 600.

The repeater server 400 functions to relay the pieces of article information of the plurality of transmission channels transmitted from a server 1100 to the client 500 and the client 600 in cooperation with a repeater server 1200 (to be described later). The client 500 has a plurality of receiving channels, receives the pieces of article information transmitted from the server 300 (server 1100) and allocated to the plurality of transmission channels, and allocates the received pieces of article information to the plurality of receiving channels.

The client 500 displays article information allocated to an arbitrary receiving channel of the plurality of receiving channel. The details of the client 500 will be described later. The client 600 has a plurality of receiving channels like the client 500, and receives/displays pieces of article information of the plurality of transmission channels transmitted from the server 300 (server 1100).

A mail server 700 for providing electronic mail service, a news server 800 for providing news information, an IRC (Internet Relay Chat) server 900 for providing chat service, and a BBS server 1000 for providing BBS service are connected to the LAN $100_2$. The electronic mail information in the mail server 700, the news information in the news server 800, chat information in the IRC server 900, and BBS information in the BBS server 1000 are used as article texts of the pieces of article information in the server 300, respectively.

The pieces of article information in the mail server 700, the news server 800, the IRC server 900, and the BBS server 1000 have different attributes. In the prior art, the pieces of article information can be received/displayed only when programs (electronic mail program, BBS program, and the like) corresponding to the attributes are started.

The server 1100 and the repeater server 1200 are connected to the LAN $100_3$. The server 1100 has a plurality of transmission channels like the server 300, and has a function of the pieces of article information respectively allocated to the plurality of transmission channels to the client 500 and the client 600 through the repeater server 1200 and the repeater server 400.

In the server 300, the transmission channel management unit 301 manages a plurality of transmission channels, and has transmission channel control units $302_1$ to $302_n$. The transmission channel control units $302_1$ to $302_n$ are provided to correspond to the plurality of transmission channels, respectively, and acquire a plurality of article texts from the mail server 700, the news server 800, the IRC server 900, and the BBS server 1000 (to be referred to as the mail server 700 or the like).

The transmission channel control units $302$ to $302_n$ allocate the pieces of article information including the acquired article texts to the transmission channels, respectively, and transmit the pieces of article information to the client 500 and the client 600. For example, the transmission channel control unit $302_1$ transmits the article information including the article text acquired from the mail server 700, and the transmission channel control unit $302_2$ transmits the article information including the article text acquired from the news server 800.

In the transmission channel control unit $302_1$, the article text acquiring unit $304_1$ sequentially acquires a plurality of article texts from the mail server 700, and gives the plurality of article texts to an article text management unit $303_1$. The article text management unit $303_1$ has a function of forming pieces of article information $JS_1$ to $JS_n$ on the basis of the plurality of article texts acquired by the article text acquiring unit $304_1$ and buffering the pieces of article information $JS_1$ to $JS_n$.

Figure 3:
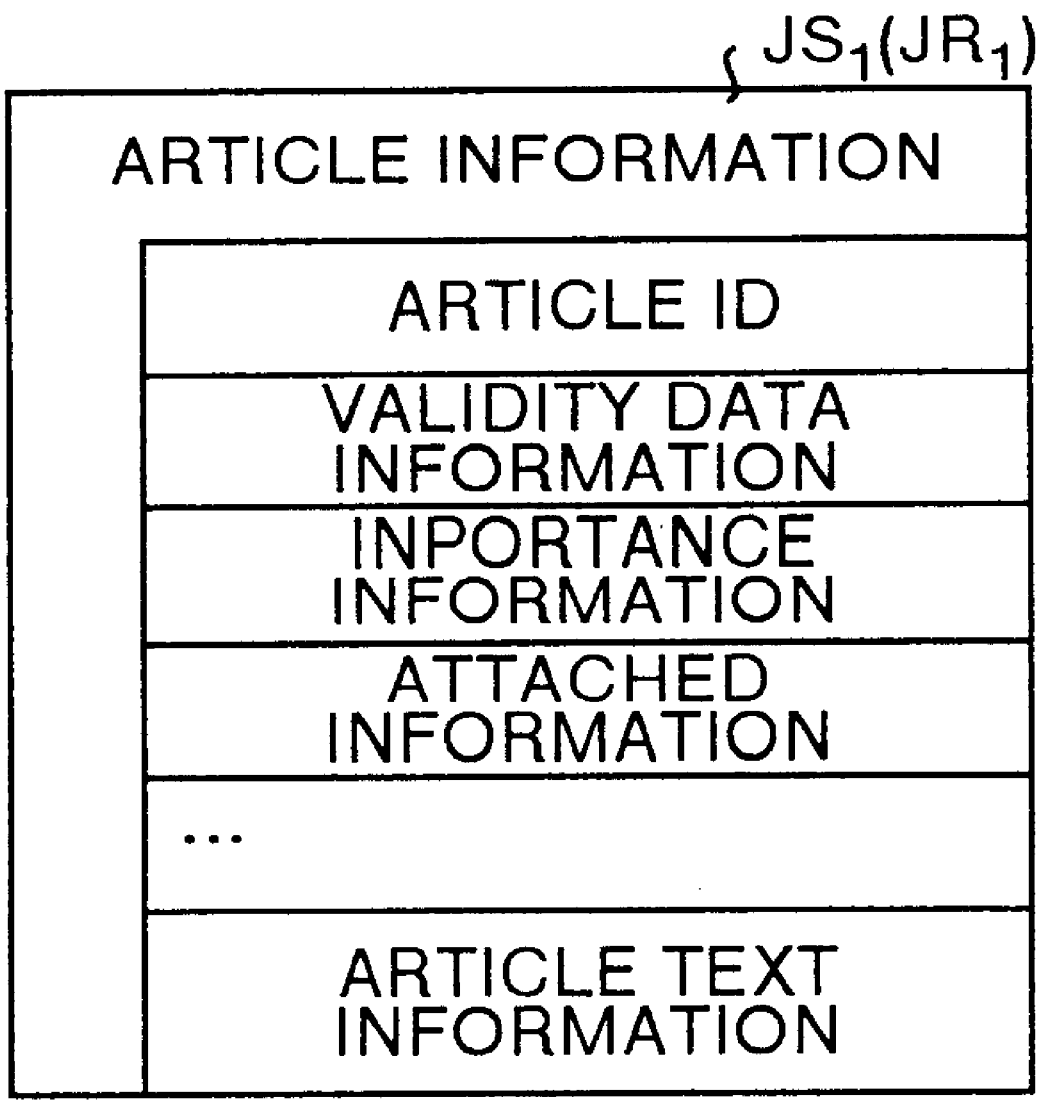
FIG. 3 is a diagram showing article information $JS_1(JR_1)$ shown in FIG. 2.

The structure of the article information $JS_1$ of the pieces of article information $JS_1$ to $JS_n$ will be described below with reference to FIG. 3. The other pieces of article information $JS_2$ to $JS_n$ have the same structure respectively as that of the article information $JS_1$. The article information $JS_1$ shown in FIG. 3 is constituted by an article ID, validity date information, importance information, attached information, and article text information. The article ID is an identifier given to uniquely specify the article information $JS_1$. The validity date information is information representing a validity date related to the display of the article information $JS_1$, and the article information $JS_1$ which has expired is wasted and is not displayed on the client 500.

The importance information is the information for setting the degree of importance of the article information $JS_1$. The article information having the high degree of importance, as will be described later, is displayed in the client 500 in preference to other pieces of article information. The attached information is information, which is added to the article text information, for obtaining detailed information related to the article text. More specifically, the attached information is used to compensate for the article text information since the article text information is a short sentence. More specifically, the attached information includes a URL (Uniform Resource Locator), a command for starting an application program (browser) for browsing a Web page, a command for operating the resources of the client 500 with the start.

An article information extraction unit $305_1$ sequentially extracts the pieces of article information $JS_1$ to $JS_n$ buffered in the article text management unit $303_1$, and gives the pieces of article information $JS_1$ to $JS_n$ to a transmission unit $306_1$ in the extraction order. The transmission unit $306_1$ transmits the pieces of article information $JS_1$ to $JS_n$ from the article information extraction unit $305_1$ to the client 500 through the LAN $100_1$ to be allocated to the transmission channels. The transmission channel control units $302_2$ to $302_n$ have the same configuration as that of the transmission channel control unit $302_1$.

In the client 500, receiving channel control units $501_1$ to $501_n$ are provided to correspond to a plurality of receiving channels, respectively. These receiving channel control units $501_1$ to $501_n$ receive/manage the pieces of article information transmitted from the server 300 and the server 1100 in units of transmission channels. For example, the receiving channel control unit $501_1$ receives/manages article information allocated to one arbitrary transmission channel of the plurality of transmission channels.

The other receiving channel control units $501_2$ to $501_n$ like the receiving channel control unit $501_1$, receive/manage pieces of article information allocated to one arbitrary transmission channel of the plurality of transmission channels. In this manner, the relationship between the plurality of transmission channels in the server 300 and the server 1100 and the plurality of receiving channels in the client 500 changes dynamically.

In the receiving channel control unit $501_1$, a receiving unit $502_1$ sequentially receives the pieces of article information (for example, the pieces of article information $JS_1$ to $JS_n$) allocated to any one transmission channel of the plurality of transmission channels, and gives the pieces of article information to an article information management unit $503_1$. The article information management unit $503_1$ has a function of buffering the pieces of article information sequentially received by the receiving unit $502_1$ as pieces of article information $JR_1$ (see FIG. 3) to JRn. The article information management unit $503_1$ manages pieces of article information in which the degrees of importance for an interrupt are set and pieces of article information in which the degrees of importance for an interrupt are set in the pieces of article information $JR_1$ to $JR_n$. Each of the receiving channel control units $502_2$ to $502_n$ has the same configuration as that of the receiving channel control units $502_1$.

Display control units $504_1$ to $504_n$ are provided to correspond to a plurality of display channels, respectively. The plurality of display channels are the channels corresponding to display windows $W_1$ to $W_n$ serving as display regions of a display 508 (to be described later) In other words, the display control unit $504_1$ to $504_n$ correspond to the display windows $W_1$ to $W_n$, respectively. The display control unit $504_1$ to $504_n$ control displays related to the pieces of article information allocated to an arbitrary receiving channel (or arbitrary receiving channels) of the plurality of receiving channels corresponding to the receiving channel control units $501_1$ to $501_n$, respectively. The relationship between the plurality of receiving channels and the plurality of display channels changes dynamically.

In the display control unit $504_1$, an article information extraction unit $505_1$ extracts pieces of article information allocated to an arbitrary receiving channel (arbitrary receiving channels) of the plurality of receiving channels in units of receiving channels from the article information management unit of the receiving channel control unit. In the example shown in FIG. 3, of the plurality of receiving channels corresponding to the receiving channel control units $501_1$ to $501_n$, two receiving channels corresponding to the receiving channel control units $501_1$ and $502_2$ correspond to one display channel corresponding to the display control unit $504_1$.

Therefore, the article information extraction unit $505_1$. extracts the pieces of article information $JR_1$ to $JR_n$ from the article information management unit $5031$ of the receiving channel control unit $501_1$, and extracts pieces of article information from an article information management unit (not shown) of the receiving channel control unit $501_2$. A control unit $506_1$ performs control to display the pieces of article information extracted in units of receiving channels by the article information extraction unit $502_1$ on the display window $W_1$ of the display 508. The details of the operation of the control unit $506_1$ will be described later.

An attached information processor $507_1$ starts an application program for browsing a webpage related to an article text and operates the resources of the client 500 on the basis of the attached information (see FIG. 3) included in the pieces of article information. Each of the display control unit $504_2$ (not shown) to $504_n$ has the same configuration as that of the display control unit $504_1$.

The display 508 is a CRT (Cathode-Ray Tube), an LCD (Liquid Crystal Display), or the like, and is controlled by the display control unit $504_1$ to $504_n$ to display the pieces of article information on the display windows $W_1$ to $W_n$ corresponding to the plurality of display channels. A pointing device 509 is to perform a drag and drop operation and a menu operation (to be described later) on the display 508. For example, the pointing device 509 is a mouse. The configuration of the client 600 is the same as that of the client 500.

Various tables for controlling the relationship between the receiving channels and the display channels in the client 500 shown in FIG. 2 will be described below with reference to FIG. 4. These tables are to independently perform control in the receiving channel control units $501_1$ to $501_n$ (plurality of receiving channels) shown in FIG. 2 and control in the display control unit $504_1$ to $504_n$ (plurality of display channels), and to dynamically change a plurality of receiving channels and a plurality of display channels.

An application control table $TA_1$ is stored in a storage unit (not shown), and is access to the receiving channel control units $501_1$ to $501_n$ and the display control unit $504_1$ to $504_n$. The application control table $TA_1$ is constituted by various pointers for performing receiving control and display control in the client 500.

More specifically, the application control table $TA_1$ is constituted by a display unit list LH constituted by display unit control table pointers $PH_1$ to $PH_n$ and a receiving channel list LR constituted by receiving channel control table pointers $PR_1$ to $PR_n$. In the display unit list LH, the display unit control table pointers $PH_1$ to $PH_n$ are pointers of display unit control tables $TB_1$ to $TB_n$ corresponding to the plurality of display channels (display control unit $504_1$ to $504_n$). On the other hand, in the receiving channel list LR, the receiving channel control table pointers $PR_1$ to $PR_n$ are pointers of receiving channel control tables $TC_1$ to $TC_n$ corresponding to the plurality of receiving channels (receiving channel control units $501_1$ to $501_n$)

The display unit control tables $TB_1$ to $TB_n$ are stored in the control units of the corresponding display control unit $504_1$ to $504_n$. The display unit control table $TB_1$ is arranged to correspond to the display control unit $504_1$, and has a display channel list LB constituted by display channel control table pointers $PB_1$ to $PB_n$. These display channel control table pointers $PB_1$ to $PB_n$ are pointers of display channel control tables $TD_1$ to $TD_n$ arranged to correspond to the plurality of display channels (display control unit $504_1$ to $504_w$) The display unit control tables $TB_2$ to $TB_n$ have the same configuration as that of the display unit control table $TB_1$.

The display channel control table $TD_1$ is constituted by a display flag $FD_1$, a receiving channel control table pointer $CP_1$, and display attribute information (not shown). The display attribute information is information for designating the size or the like of the display screen in the display 508. The display flag $FD_1$ is a flag representing whether the pieces of article information allocated to the display channel can be displayed on the display window $W_1$ of the display 508 shown in FIG. 2. For example, the display flag $FD_1$ is turned on/off by pressing a software button $A_1$ (to be described later) shown in FIG. 7A. The receiving channel control table pointer $CP_1$ is a pointer of the receiving channel control table $TC_1$ corresponding to a receiving channel.

Figure 5:
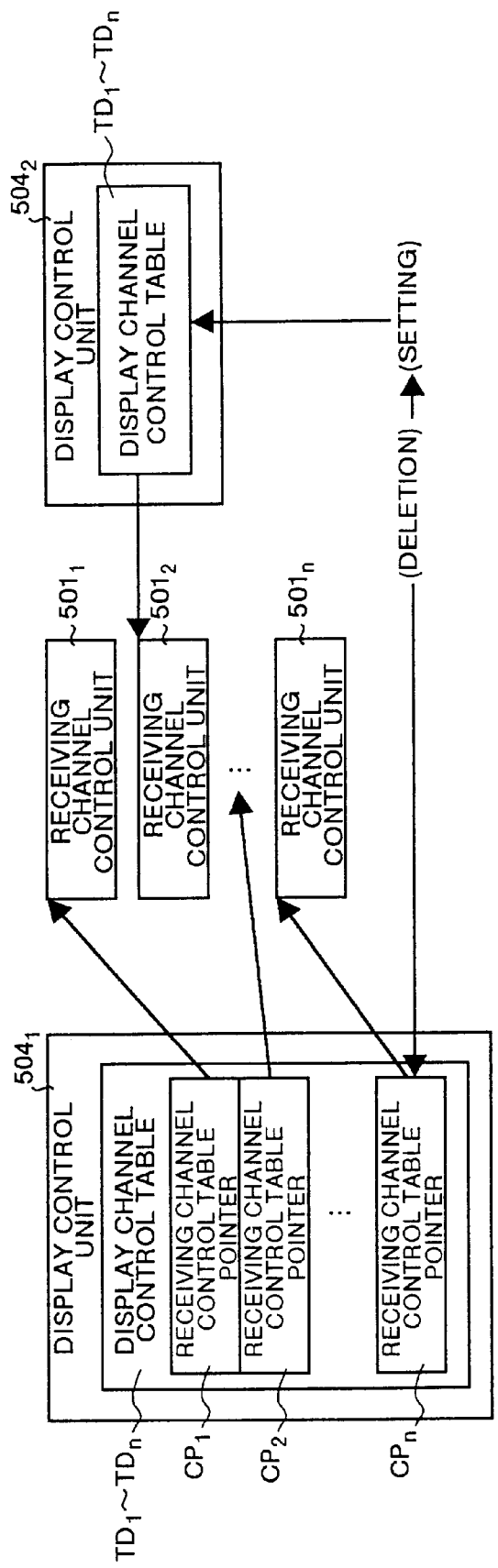
FIG. 5 is a diagram for explaining display control units $504_1$ and $504_2$ in the client 500 shown in FIG. 2.

In other words, the receiving channel control table pointer $CP_1$ is a pointer corresponding to the receiving channel control unit $501_1$ (receiving channel) shown in FIG. 5. Each of the display channel control tables $TD_2$ to $TD_n$ has the same configuration as that of the display channel control table $TD_1$. The display channel control tables $TD_2$ to $TD_n$ have receiving channel control table pointers $CP_2$ to $CP_n$ shown in FIG. 5, display flags, and pieces of attribute information. By setting or deletion of the receiving channel control table pointers $CP_1$ to $CP_n$ shown in FIG. 5, the relationship between the receiving channels and the display channels dynamically changes.

The receiving channel control tables $TC_1$ to $TC_n$ are stored in the article information management units of the corresponding receiving channel control units $501_1$ to $501_n$. The receiving channel control table $TC_1$ is a table used for receiving control in the receiving unit $502_1$ (receiving channel), and is constituted by a receiving flag $FR_1$, a communication control information table $TT_1$, and an article information list LK. The receiving flag $FR_1$ is a flag representing whether pieces of article information allocated to the transmission channel described above are received. The communication control information table $TT_1$ is a table constituted by pieces of communication control information related to reception of the pieces of information. The article information list LK is constituted by the pieces of article information $JR_1$ to $JR_n$ (see FIG. 2). The receiving channel control tables $TC_2$ to $TC_n$ have the same configuration as that of the receiving channel control table $TC_1$.

The operation of the embodiment described above will be described below. As shown in FIG. 2, the transmission channel control units $302_1$ to $302_n$ of the server 300 acquire a plurality of article texts having different attributes from the mail server 700 or the like, allocates the pieces of information (see FIG. 3) including the article texts to the transmission channels, respectively, and transmits the pieces of article information to the client 500 and the client 600. The pieces of article information allocated to the plurality of transmission channels are pieces of information having different attributes.

For example, when the plurality of article texts are sequentially acquired from the mail server 700 by the article text acquiring unit $304_1$ of the transmission channel control unit $302_1$ the article text management unit $303_1$ forms pieces of article information $JS_1$ to $JS_n$ (see FIG. 3) on the basis of the plurality of article texts acquired by the article text acquiring unit $304_1$, and buffers the pieces of article information $JS_1$ to $JS_n$. Each of the pieces of article information $JS_1$ to $JS_n$, as shown in FIG. 3, is constituted by an article ID, validity date information, importance information, attached information, and article text information. Similarly, in the transmission channel control units $302_1$ to $302_n$ and the server 1100, as in the transmission channel control unit $302_1$, the article texts are acquired, and the pieces of article information are formed and buffered.

The transmission channel control units $302_1$ to $302_n$ in the server 300 and the server 1100 allocate pieces of article information to the transmission channels, and transmit the pieces of article information to the receiving channels of the client 500 and the client 600. For example, when the pieces of article information $JS_1$ to $JS_n$ buffered by the article text management unit $303_1$ are sequentially extracted by the article information extraction unit $3051_1$, the transmission unit $306_1$ allocates the pieces of article information $JS_1$ to $JS_n$ to the transmission channel to transmit the pieces of article information $JS_1$ to $JS_n$ to the receiving channel control unit $501_1$ (receiving channel) and the client 600 through the LAN $100_1$.

Similarly, the transmission channel control unit $302_2$ transmits the pieces of article information to the receiving channel control unit $501_2$ and the client 600 through the LAN $100_1$. The server 1100 transmits the pieces of information to the receiving channel control unit $501_n$ and the client 600 by using the repeater server 1200 and the repeater server 400.

In the client 500, the receiving channel control units $501_1$ to $501_n$ receive the pieces of article information transmitted from the server 300 and the server 1100 in units of transmission channels. For example, the receiving channel control unit $501_1$ receives pieces of article information allocated to the transmission channel corresponding to the transmission channel control unit $302_1$ of the plurality of transmission channels, and the receiving channel control unit $501_2$ receives pieces of article information allocated to the transmission channel corresponding to the transmission channel control unit $302_2$.

Similarly, the receiving channel control unit $501_n$ receives the pieces of article information allocated to the transmission channel corresponding to the server 1100. The pieces of article information received by the receiving channel control unit $501_1$ to the receiving channel control unit $501_n$ are pieces of information having different attributes. The article information management units of the receiving channel control units $501_1$ to $501_n$ buffer the received pieces of article information.

Figure 4:
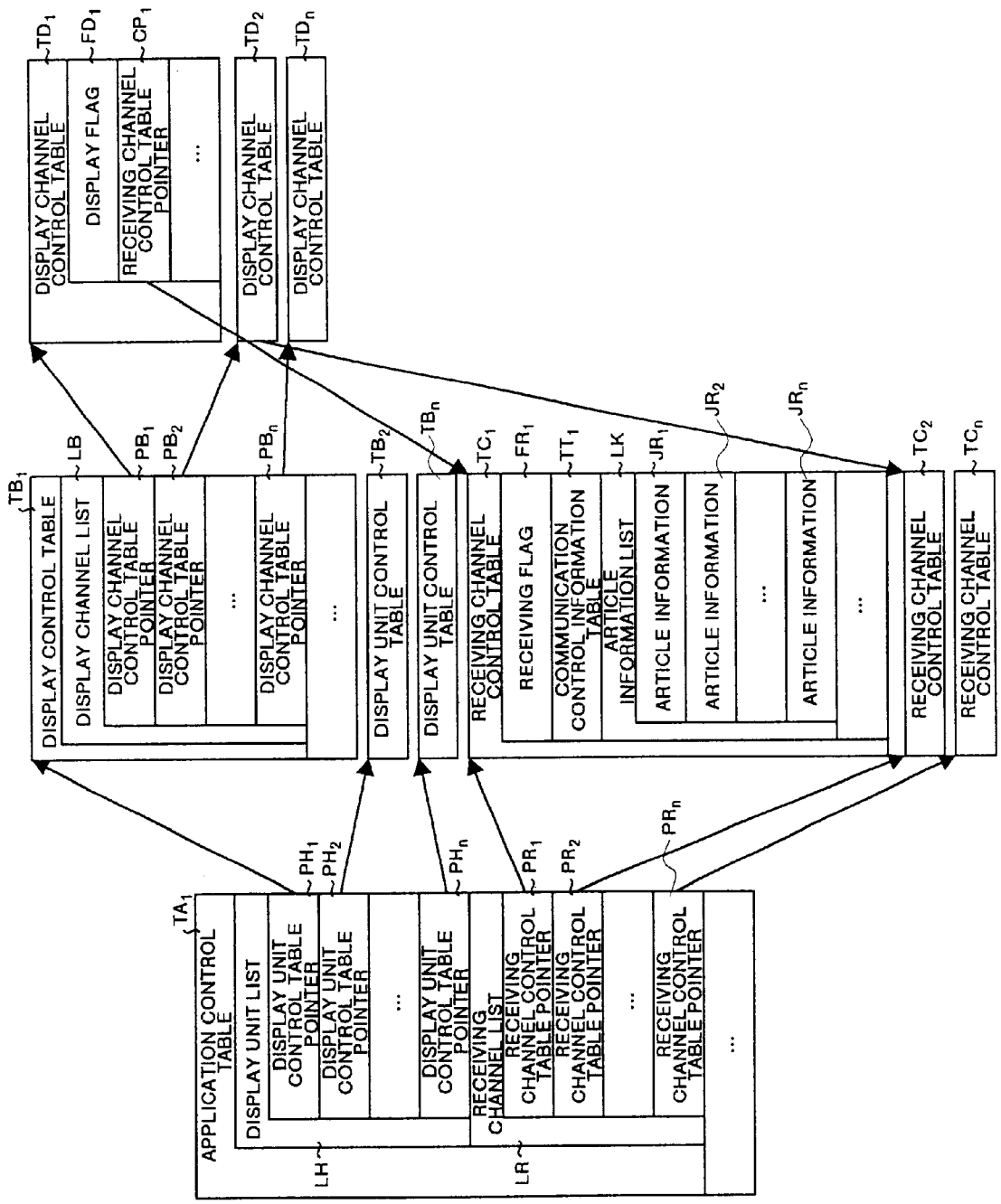
FIG. 4 is a diagram showing various tables in a client 500 shown in FIG. 2.

The article information extraction units of the display control unit $504_1$ to $504_n$ search the display unit control tables $TB_1$ to $TB_n$ corresponding to the display channels of the article information extraction units and shown in FIG. 4 to set a display channel control table pointer (see the display channel control table pointer $PB_1$). The operations of the display control units $504_1$ and $504_2$ will be mainly described below.

It is assumed here that the display control unit $504_1$ sets the display channel control table pointer $PB_1$ to the display channel control table $TD_1$ with reference to the display unit control table $TB_1$ and sets the display channel control table pointer $PB_2$ to the display channel control table $TD_2$. It is also assumed that the display control unit 5042 sets a display channel control table pointer to the display channel control table $TD_3$ (not shown) with reference to the display unit control table $TB_2$ and sets a display channel control table pointer to the display channel control table $TD_4$ (not shown).

Further, it is assumed that the display control unit $504_1$ sets the receiving channel control table pointers $CP_1$ and $CP_2$ (not shown) whose display flags are on with reference to the display channel control tables $TD_1$ and $TD_2$. These receiving channel control table pointers $CP_1$ and $CP_2$ correspond to channels CH-A and CH-B shown in FIG. 7A.

The channels CH-A and CH-B are receiving channels corresponding to the receiving channel control unit $501_2$ corresponding to the receiving channel control unit $501_1$ shown in FIG. 2. Thus, one display channel corresponding to the display control unit $504_1$ are caused to correspond to two display channels corresponding to the receiving channel control unit $501_2$.

The display control unit $504_1$ refers to the receiving channel control tables $TC_1$ and $TC_2$ on the basis of the receiving channel control table pointers $CP_1$ and $CP_2$. In this manner, the article information extraction unit $505_1$ of the display control unit 504, extracts two types of pieces of article information having different attributes from the receiving channel control units $501_1$ (channel CH-A) and $501_2$ (channel CH-B), and gives the pieces of article information to the control unit $506_1$.

Figure 7A:
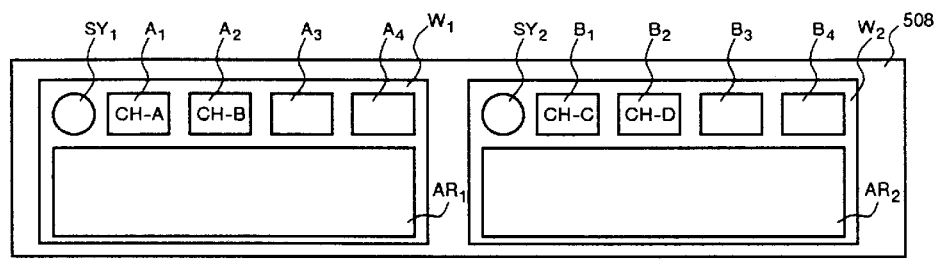
FIG. 7A to FIG. 7D are diagrams showing operation example 1 of the display window in the client 500 shown in FIG. 2.

In this manner, the control unit $506_1$ of the display control unit $504_1$ establishes the display window $W_1$ in the display 508 shown in FIG. 7A to display pieces of article information corresponding to the channels CH-A and CH-B on a display region AR, (see FIG. 10) on the display window $W_1$. In this display, on the basis of the importance information described above, article information having a high degree of importance is displayed in preference to other pieces of article information.

The display control unit $504_1$ and the display control unit $504_2$ checks a validity date (see FIG. 3) included in the pieces of article information to perform such display control that pieces of article information which do not have expired are displayed and that pieces of article information which have expired are not displayed. For example, article information having a high degree of importance is displayed immediately after the article information is received or is repeatedly displayed. The display control based on the degree of importance will be described later with reference to FIG. 13.

On the display window $W_1$, a display window symbol $SY_1$ serving as a software button and software buttons $A_1$ to $A_4$ are displayed. Of the software buttons $A_1$ to $A_4$, the channels CH-A and CH-B are allocated to the software buttons $A_1$ and $A_2$, and any channels are not allocated to the software buttons $A_3$ and $A_4$.

Figure 10:
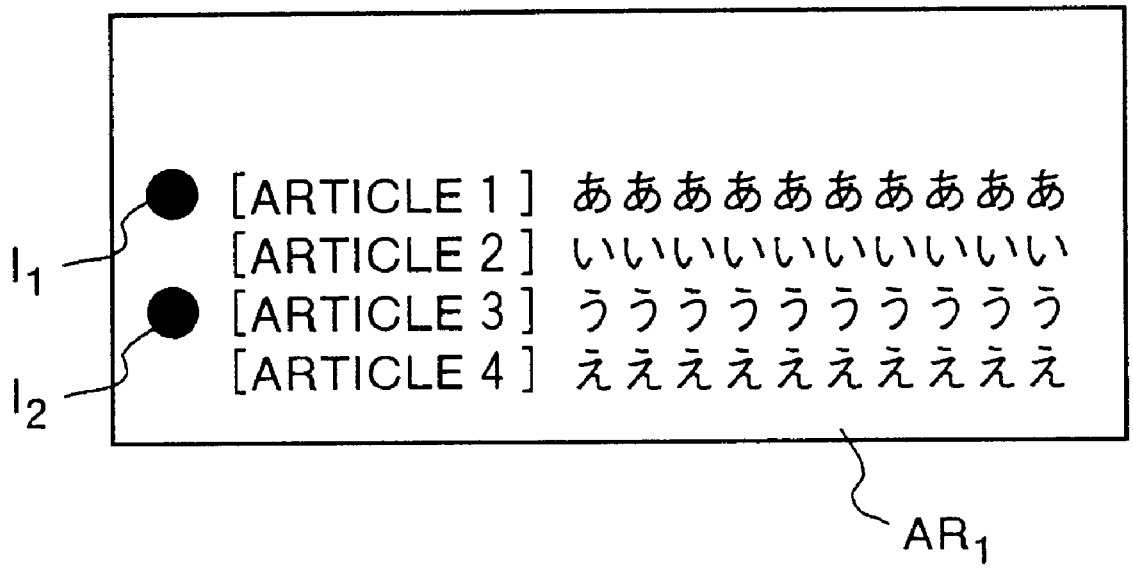
FIG. 10 is a diagram showing a display example in display region $AR_1$ shown in FIG. 7.

As shown in FIG. 10, in the display region $AR_1$ of the display window $W_1$, [article 1] to [article 4] are displayed. Info icons $I_1$ and $I_2$ are software buttons representing that pieces of attached information (see FIG. 3) are added to pieces of article information corresponding to [article 1] and [article 3].

On the other hand, in FIG. 2, the display control unit $504_2$ (not shown) performs the same operation as that of the display control unit $504_1$ to acquires two types of pieces of article information having different attributes from the receiving channel control unit $501_3$ (not shown) and the receiving channel control unit $501_4$ (not shown) corresponding to a channel CH-C and a channel CH-D shown in FIG. 7A. As shown in FIG. 2, the channels CH-C and CH-D are a receiving channel corresponding to the receiving channel control unit $501_3$ (not shown) and a receiving channel corresponding to the receiving channel control unit $501_4$ (not shown), respectively. Thus, one display channel corresponding to the display control unit $504_2$ is caused to correspond to two display channels corresponding to the receiving channel control units $501_3$ and $501_4$.

The display control unit $504_2$ establishes the display window $W_2$ in the display 508 shown in FIG. 7A to display pieces of article information corresponding to the channels CH-C and CH-D on a display region $AR_2$ on the display window $W_2$. On the display window $W_2$, a display window symbol $SY_2$ serving as a software button and software buttons $B_1$ to $B_4$ are displayed. Of the software buttons $B_1$ to $B_4$, the channels CH-C and CH-D are allocated to the software buttons $B_1$ and $B_2$, and any channels are not allocated to the software buttons $B_3$ and $B_4$.

More specifically, as shown in FIG. 7A, the two display windows $W_1$ and $W_2$ are established on the display 508. A recipient visually checks the display 508 to make it possible to browse the pieces of article information corresponding to the channels CH-A to CH-D and having different attributes.

Figure 6:
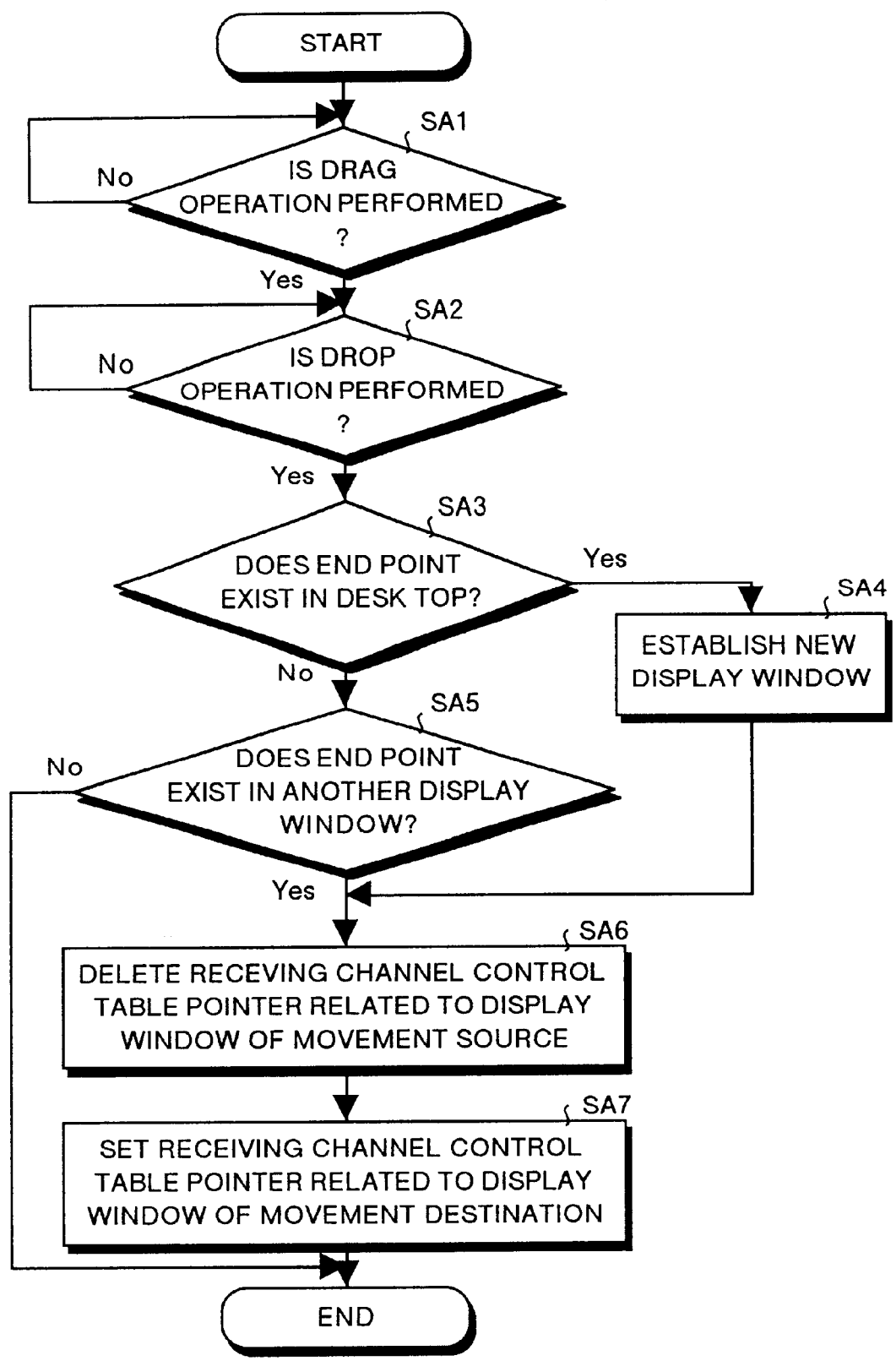
FIG. 6 is a flow chart for explaining an operation of the embodiment.
Figure 7B:
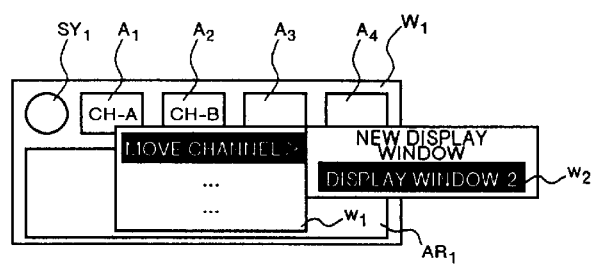
Figure 7C:
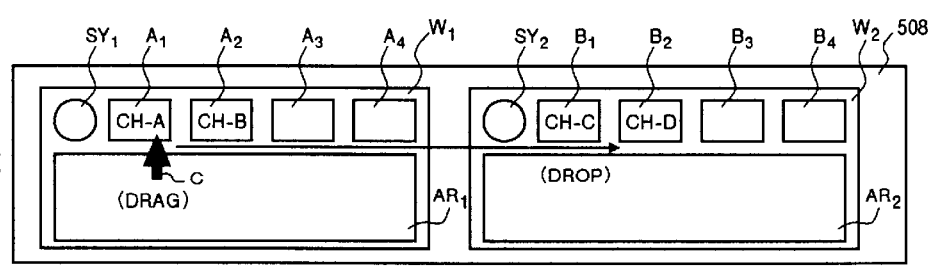

An operation performed when the channel CH-A on the display window $W_1$ shown in FIG. 7A is moved to the display window $W_2$ will be described below with reference to FIG. 5 and FIG. 6. The operation of the display control unit $504_1$ will be mainly described below. In step SA1 shown in FIG. 6, the display control unit 504, checks whether a drag operation related to the software button $A_1$ or $A_2$ shown in FIG. 7C is performed or not by using the pointing device 509 (see FIG. 2). The decision result is set as "No" here, and the same decision is repeated.

When the drag operation of the software button $A_1$ (channel CH-A) is performed, the display control unit $504_1$ set the decision result in step SA1 as "Yes" to shift to step SA2. In step SA2, the display control unit $504_1$ checks whether a drop operation is performed or not. The decision result is set as "No" here, and the same decision is repeated. If the drop operation is performed on the display window $W_2$, the display control unit $504_1$ sets the decision result in step SA2 as "Yes" to shift to step SA3.

In step SA3, the display control unit $504_1$ checks whether the end point of the drag operation exists on the desk top. The decision result is set as "No" here, the display control unit $504_1$ shifts to step SA5. When the decision result in step SA3 is "Yes", the display control unit $504_1$ shifts to step SA4 to establish a new display window. On this new display window, article information related to the channel CH-A is displayed.

In step SA5, the display control unit $504_1$ checks whether the end point exists on another display window. The display control unit $504_1$ sets the decision result as "Yes" here and shifts to step SA6. If the decision result in step SA5 is "No" the display control unit $504_1$ ends the process. In step SA6, the display control unit $504_1$ deletes a receiving channel control table pointer related to the display window $W_1$ serving as a movement-source as shown in FIG. 5. More specifically, the display control unit $504_1$ deletes the receiving channel control table pointer $CP_1$ on the display channel control table $TD_1$ shown in FIG. 4.

In the next step SA7, the display control unit $504_2$ sets a receiving channel control table pointer related to the display window $W_2$ of the movement destination. More specifically, the display control unit $504_2$ sets the receiving channel control table pointer $CP_2$ (see FIG. 5) on the display channel control table $TD_2$ shown in FIG. 4. In this manner, as shown in FIG. 7C, allocation of the channel CH-A is changed from the software button $A_1$ of the display window $W_1$ to the software button $B_3$ of the display window $W_2$.

With this change, on the display window $W_1$, allocation of the channels CH-B is changed from the software button $A_2$ to the software button $A_1$. Thus, on the display window $W_1$, article information corresponding to the channels CH-B is displayed, and pieces of article information corresponding to the channels CH-A, CH-C, and CH-D are displayed on the display window $W_2$.

Figure 8A:
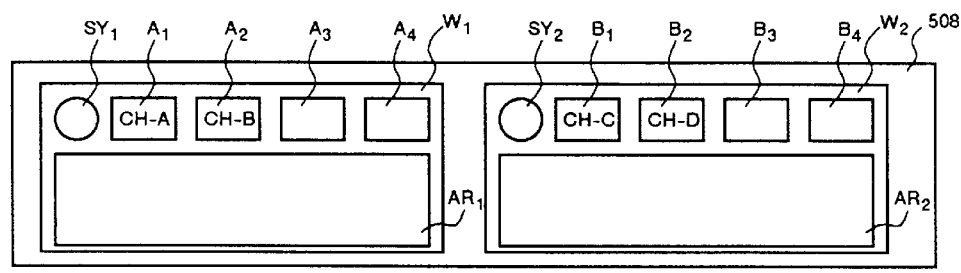
FIG. 8A to FIG. 8D are diagrams showing operation example 2 of the display window in the client 500 shown in FIG. 2.
Figure 8B:
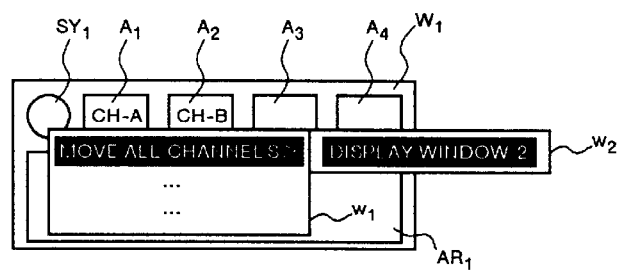
Figure 8C:
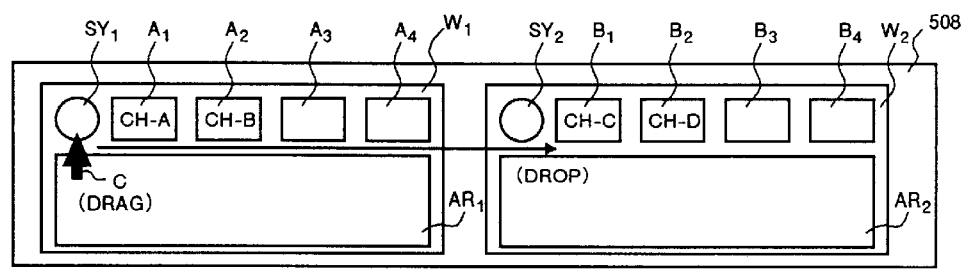
Figure 8D:
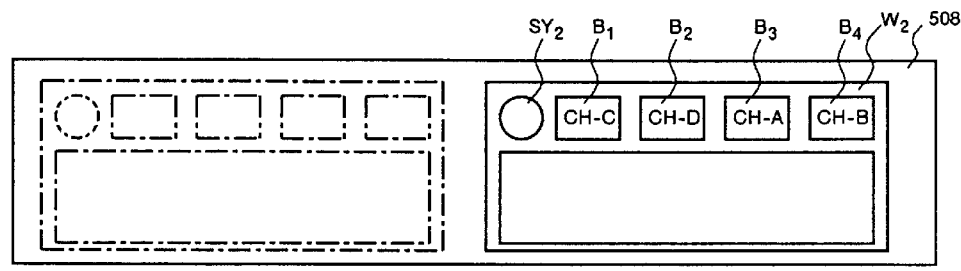

In the above description, part of the channel CH-A on the display window $W_1$ is moved to the display window $W_2$ was explained. However, as shown in FIGS. 8A, 8C, and 8D, all the channels CH-A and CH-B on the display window $W_1$ may be moved to the display window $W_2$. A basic operation in this case is the same as the operation related to the movement of the channel CH-A described above. The drag and drop operation with respect to the display window symbol $SY_1$ on the display window $W_1$ are performed.

More specifically, when a drop operation is performed in the display window $W_2$ after a drag operation of the display window symbol $SY_1$ shown in FIG. 8C is performed, as shown in FIG. 8D, the display window $W_1$ is eliminated, and the channels CH-A and CH-B are allocated to the software buttons $B_3$ to $B_4$ on the display window $W_2$.

Figure 9:
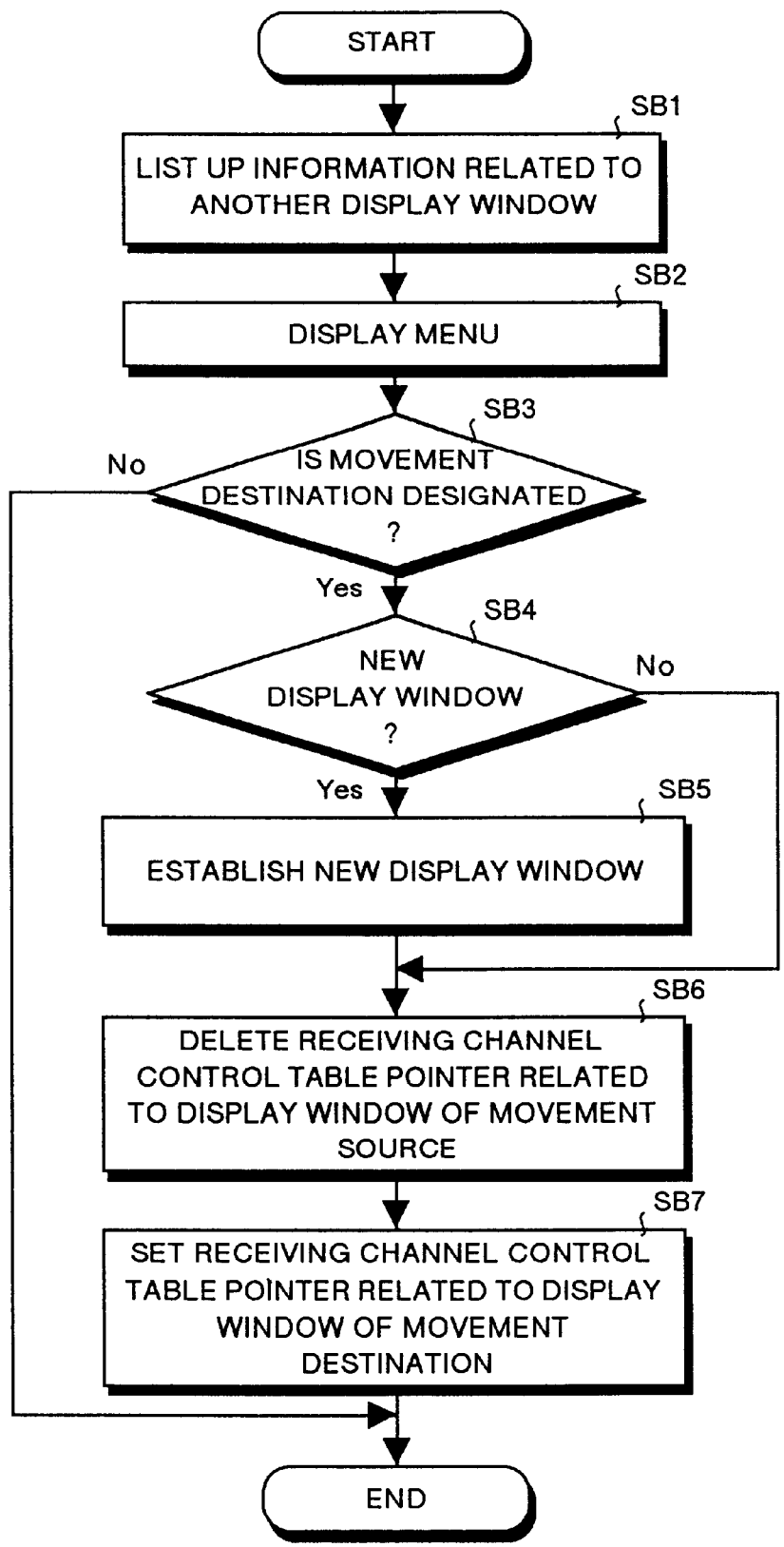
FIG. 9 is a flow chart for explaining an operation of the embodiment.

In the embodiment, in place of the drop & drag operations, the channels may be moved between the display windows by a manu operation. This case will be described below with reference to the flow chart shown in FIG. 9. When right clock is performed by the pointing device 509 on the software button $A_1$ (channel CH-A) shown in FIG. 7B, the display control unit $504_1$ shifts to step SB1 shown in FIG. 9 to list up pieces of information of the channels related to the other window $W_2$. The display control unit $504_1$ shifts to step SB2 to display the menu shown in FIG. 7B, and then shifts to step SB3. Instep SB3, the display control unit $504_1$ check whether a movement destination is designated or not. If the decision result is "No", the display control unit $504_1$ ends the series of processes.

It is assumed here that "display window-2" is designated by a click operation of the pointing device 509 subsequent to "move channel", the display control unit $504_1$ sets the decision result as "Yes" to shift to step SB4, and checks whether "new display window" is designated or not. The display control unit $504_1$ sets the decision result as "No" here and shifts to step SB6.

In step SB6, the display control unit $504_1$ deletes a receiving channel control table pointer related to the display window $W_1$ of the movement source. In the next step SB7, the display control unit $504_2$ sets a receiving channel control table pointer related to the display window $W_2$ of the movement destination.

Figure 7D:
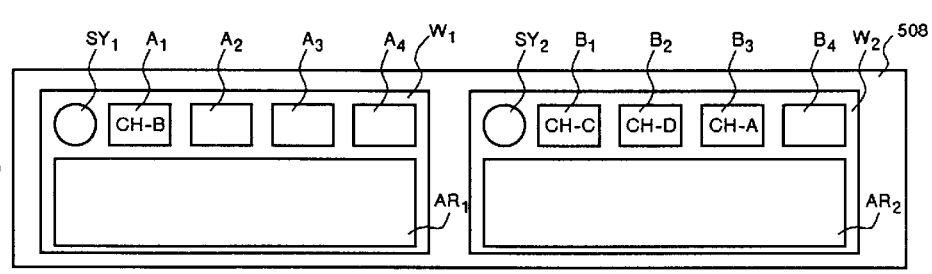

In this manner, as shown in FIG. 7C, allocation of the channel CH-A is changed from the software button $A_1$ of the display window $W_1$ to the software button $B_3$ of the display window $W_2$ as shown in FIG. 7D. Thus, on the display window $W_1$, pieces of article information corresponding to the channel CH-B are displayed. On the display window $W_2$, pieces of article information corresponding to the channels CH-A, CH-C, and CH-D are displayed.

In the above description, part of the channel CH-A on the display window $W_1$ is moved to the display window $W_2$ was explained. However, as shown in FIGS. 8B and 8D, all the channels CH-A and CH-B on the display window $W_1$ may be moved to the display window $W_2$. A basic operation in this case is the same as the operation related to the movement of the channel CH-A described above.

After "move all channels" is clicked in the manu shown in FIG. 8B, "display window-2" is clicked. In this manner, as shown in FIG. 8D, the display window $W_1$ is eliminated, and the channels CH-A and CH-B are allocated to the software buttons $B_3$ and $B_4$ on the display window $W_2$.

Figure 11:
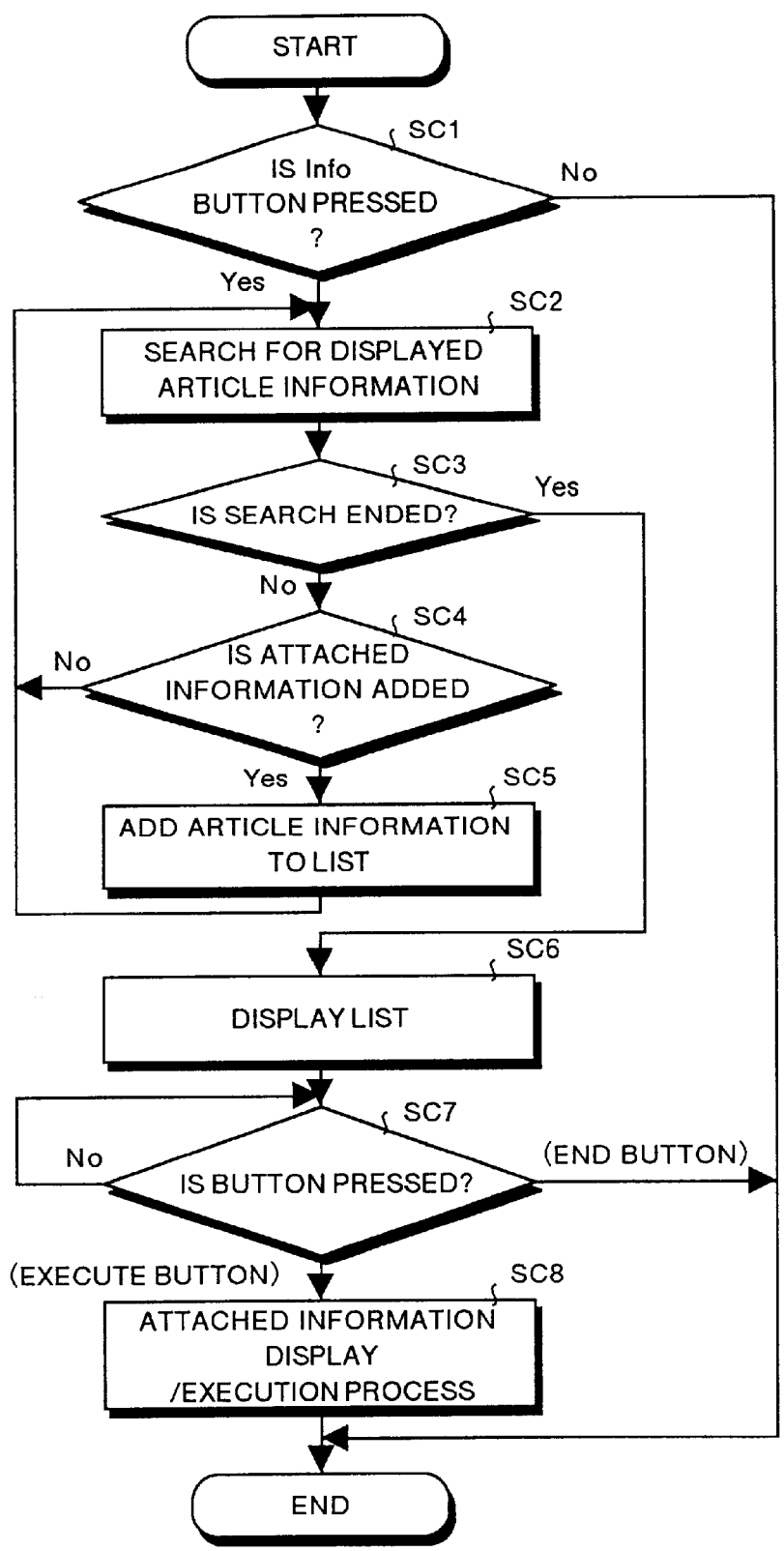
FIG. 11 is a flow chart for explaining an operation of the embodiment.

The display control unit $504_1$ shown in FIG. 2 executes the process shown in FIG. 11. This process is a process of searching for pieces of article information including the attached information (see FIG. 3) in pieces of article information related to receiving channels (in this case, the receiving channels of the receiving channel control units $501_1$ and $501_2$) corresponding to the display channels of the display control unit $504_1$ and displaying the attached information on the basis of the search result.

In step SC1 shown in FIG. 11, the display control unit $504_1$ checks whether an info button (not shown) on the display 508 is pressed or not. If the decision result is "No", the process is ended. When the info button is pressed, the display control unit $504_1$ sets the decision result in step SC1 as "Yes" to shift to step SC2. In step SC2, the display control unit $504_1$ begins to search for pieces of article information which have been displayed from the pieces of article information in the receiving channel control units $501_1$ and $501_2$ to shift to step SC3.

In step SC3, the display control unit $504_1$ checks whether the search is ended or not. The display control unit $504_1$ sets the decision result in step SC3 as "No" here and shifts to step SC4. In step SC4, the display control unit $504_1$ checks, on the basis of the search result, whether attached information (see FIG. 3) is added or not. If the decision result is "No", the display control unit $504_1$ returns to step SC2. On the other hand, the decision result in step SC4 is "Yes", the display control unit $504_1$ shifts to step SC5 to add the article information to a list related to the attached information, and then returns to step SC2.

Upon completion of the search, the display control unit $504_1$ sets the decision result in step SC3 as "Yes" to shift to step SC6. After the display control unit $504_1$ displays a list constituted by [article 1] to [article 4] and info icons $I_1$ and $I_2$ in the display region $AR_1$ shown in FIG. 10, the display control unit $504_1$ shifts to step SC7. In step SC7, the display control unit $504_1$ checks whether the button is pressed or not. The display control unit $504_1$ sets the decision result as "No" here, and repeats the same decision.

When an end button (not shown) is pressed, the display control unit $504_1$ ends the process. When the info icon $I_1$ shown in FIG. 10 is clicked as an execution button, the display control unit $504_1$ shifts to step SC8. In step SC8, the display control unit $504_1$, on the basis of the attached information related to [article 1], execute the process of acquiring more detailed information and the display process.

More specifically, the attached information processor $507_1$ acquires the URL of the Web page which explains the details of the article text corresponding to [article 1] from the attached information, and starts an application program (browser) for browsing the Web page. The attached information processor $507_1$ acquires information related to [article 1] from the Web page, and displays the detailed information on the display 508 to cause the detailed information to correspond to [article 1].

Figure 12:
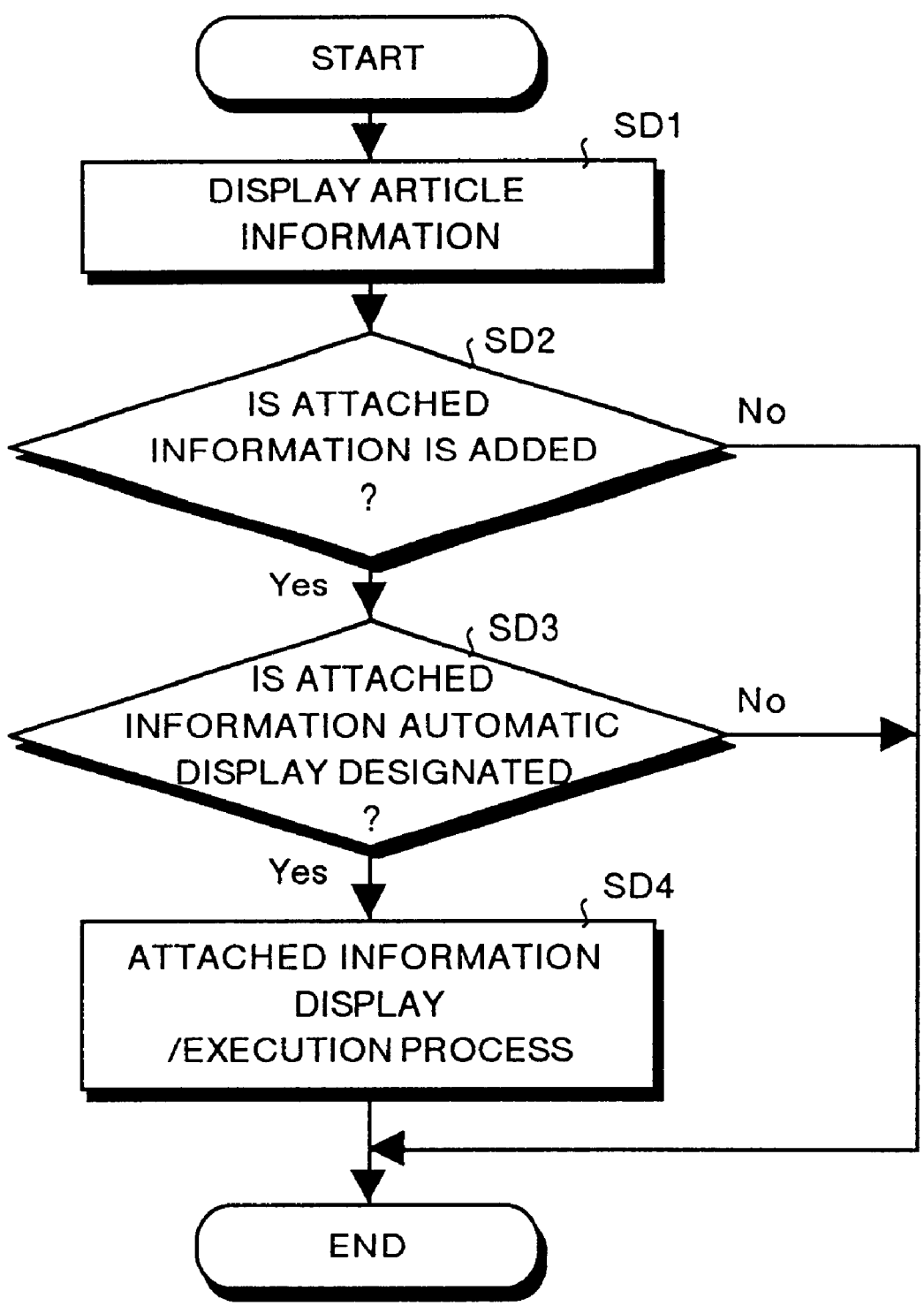
FIG. 12 is a flow chart for explaining an operation of the embodiment.

In this embodiment, in addition to the method described with reference to FIG. 11, the acquisition of the attached information and the display process may be performed according to the flow chart shown in FIG. 12 when article information is displayed on the display 508. More specifically, in step SD1 shown in FIG. 12, the display control unit $504_1$ displays a list of pieces of article information on the display 508 to shift to step SD2. In step SD2, the display control unit $504_1$ checks whether the attached information (see FIG. 3) is added to the article information. If the decision result is "No", the process is ended.

On the other hand, if the decision result in step SD2 is "Yes", the display control unit $504_1$ shifts to step SD3 to check whether designation is made to automatically display the attached information on the display 508. If the decision result is "No", the process is ended. If the decision result in step SD3 is "Yes", the display control unit $504_1$ executes the process of acquiring more detailed information related to the article information and a display process as in step SC8 (see FIG. 11).

Figure 13:
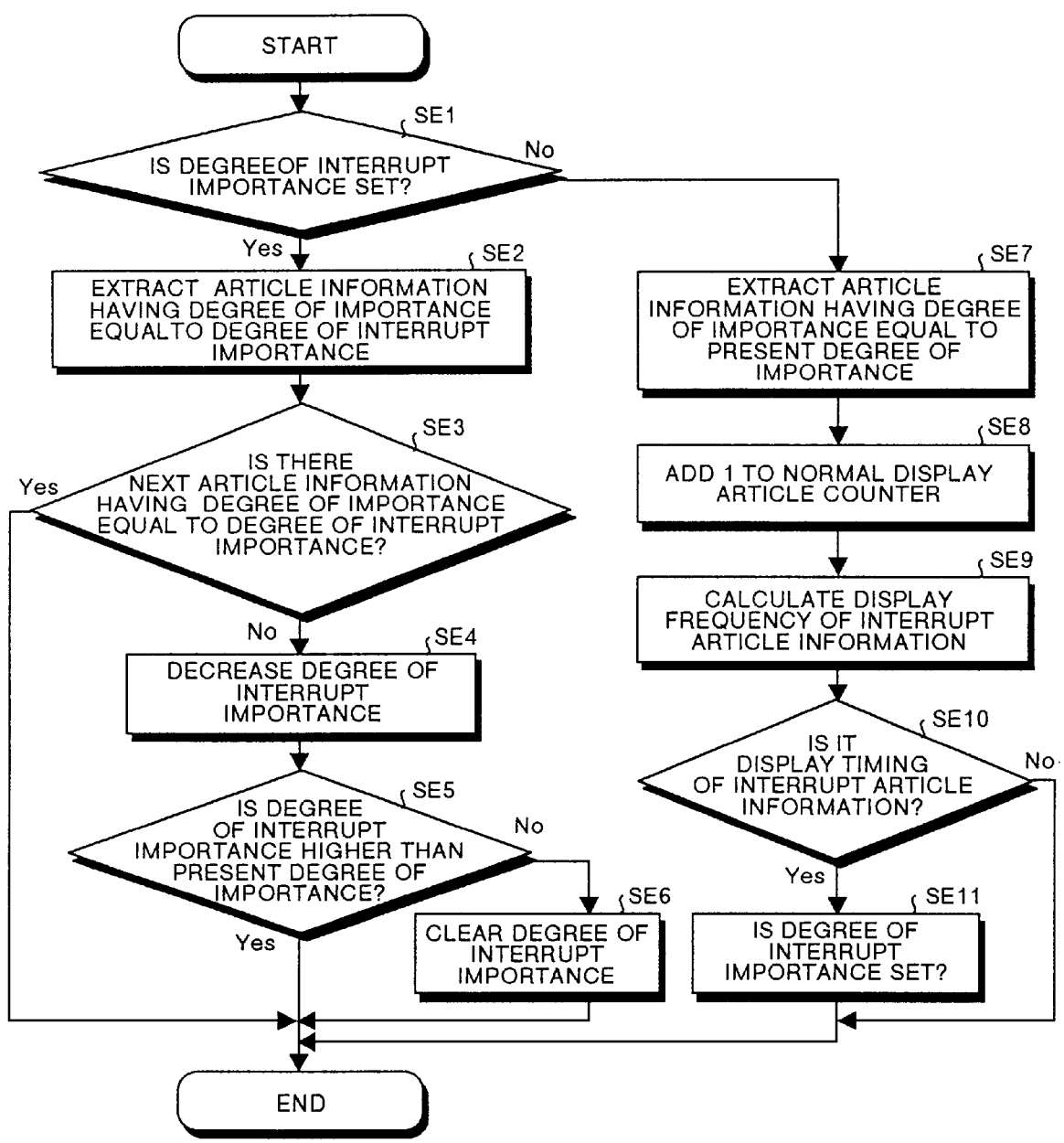
FIG. 13 is a flow chart for explaining an operation of the embodiment.

In this embodiment, the display control unit $504_1$ ($504_2$ to $504_n$) executes the process of displaying the pieces of article information on the display window $W_1$ of the display 508 according to the flow chart shown in FIG. 13 on the basis of the importance information (see FIG. 3) described above. As a method of displaying the pieces of article information, a method (to be referred to as a normal display hereinafter) in which the pieces of article information are displayed in the importance order and a method (to be referred to as an interrupt display hereinafter) in which a display of an interrupt article information having a very high degree of importance is performed to be interrupted in the displays of the other pieces of article information are known. In the following description, the degree of importance related to the article information subjected to an interrupt display is called the degree of interrupt importance.

In step SE1 shown in FIG. 13, the display control unit $504_1$ checks the degree of interrupt importance is set or not. If the degree of interrupt importance is not set, the display control unit $504_1$ sets the decision result in step SE1 as "No" to shift to step SE7. In step SE7, the display control unit $504_1$ extracts article information having a degree of importance equal to the present degree of importance which is set in advance from the pieces of article information held in the receiving channel control unit $501_1$ ($501_2$), normally displays the article information on the display window $W_1$ (see FIG. 7A) of the display 508, and then shifts to step SE8. In step SE8, the display control unit $504_1$ increments a normal display article counter (not shown) by one, and then shifts to step SE9. This normal display counter is a counter for counting pieces of article information which are normally displayed.

In step SE9, the display control unit $504_1$ calculates an interrupt article display frequency, and then shifts to step SE10. The interrupt article display frequency is a frequency at which an interrupt display related to article information having a very high degree of importance is executed, and is represented by the number of pieces of article information which are normally displayed. For example, when the interrupt article display frequency is "5", one piece of article information is interrupt-displayed while five pieces of article information are normally displayed. In step SE10, the display control unit $504_1$ checks whether the display timing of the interrupt article is set or not.

More specifically, the display control unit $504_1$ makes the decision in step SE10 by checking whether the value of the normal display article counter is equal to the interrupt article display frequency (e.g., "5") calculated in step SE9. If the decision result in step SE10 is "No", the display control unit $504_1$ ends the normal display process related to the first article information, and then executes the processes subsequent to step SE1 with respect to the next article information.

The display control unit $504_1$ sets the decision result in step SE1 as "No" here, and shifts to step SE7 to execute the same processes as described above. More specifically, in step SE7, an extraction process and a normal display process related to the next article information are executed. In step SE8, the normal display article counter is incremented by one. Subsequently, the normal display process described above is repeated until the decision result in step SE10 becomes "Yes".

When the value of the normal display article counter is equal to the interrupt article display frequency, and when it is an interrupt article display timing, the display control unit $504_1$ shifts to step SE11 to set the degree of interrupt importance. Thereafter, the processes subsequent to step SE1 related to the next article information are executed. The degree of interrupt importance set here is a threshold value for selecting a high degree of importance from the degrees of importance which are set for the pieces of article information.

In step SE1, the degree of interrupt importance is set, the display control unit $504_1$ sets the decision result as "Yes" to shift to step SE2. In step SE2, the display control unit $504_1$ extracts article information having a degree of importance equal to the degree of interrupt importance from the pieces of article information held in the receiving channel control unit $501_1$ (or $501_2$), interrupt-displays the article information, and shifts to step SE3. Thus, after five pieces of article information are normally displayed, one piece of article information is interrupt-displayed. That is, article information having a very high degree of importance is interrupt-displayed once for five times.

In step SE3, the display control unit $504_1$ checks whether there is the next article information having a degree of importance equal to the degree of interrupt importance. If the decision result is "Yes", the processes subsequent to step SE1 are executed again. If the decision result in step SE3 is "No", the display control unit $504_1$ shifts to step SE4.

In step SE4, the display control unit $504_1$ decreases the degree of interrupt importance by a predetermined degree (e.g., "1"), and then shifts to step SE5. In step SE5, the display control unit $504_1$ checks whether the degree of interrupt importance is higher than the present degree of importance. If this decision result is "No", the display control unit $504_1$ shifts to step SE6. In step SE6, the display control unit $504_1$ clears the degree of interrupt importance, and repeatedly executes the processes subsequent to step SE1. When the degree of interrupt importance is higher than the present degree of importance, the display control unit $504_1$ executes the processes subsequent to step SE1.

In this manner, the processes in steps SE1 to SE11 described above are repeated, so that article information having a very high degree of importance is interrupt-displayed while the other pieces of article information. When the article information having a very high degree of importance is frequently interrupt-displayed, the interrupt article display frequency (see step SE9) may be set to be a small value. In the embodiment, the order of priority may be added to a plurality of receiving channels, and pieces of article information related to the plurality of receiving channels may be displayed in one display window of the display 508.

As described above, according to this embodiment, the plurality of receiving channel control units $501_1$ to $501_n$ for receiving pieces of article information respectively allocated to a plurality of transmission channels and having different attributes are arranged, and the pieces of article information received by the receiving channel control units $501_1$ to $501_n$ can be displayed on the display 508 at once. Therefore, unlike the prior art, since a dedicated program (electronic mail program or BBS program) need not be started for every attribute, the pieces of article information having different attributes can be reliably informed to a recipient.

According to this embodiment, since the relationship between a plurality of receiving channels and a plurality of display channels is dynamically changed, necessary article information and unnecessary article information for a recipient can be selected and rejected. Therefore, necessary article information mixed with unnecessary article information can be prevented from being overlooked.

According to this embodiment, pieces of importance information (see FIG. 3) are added to pieces of article information, respectively, and article information having a high degree of importance is preferentially displayed on the display 508. Thus, recipient's attention to the article information having a high degree of importance can be called. Therefore, since attached information is included in article information to display a normal article text and detailed information, correct information can be informed to the recipient.

According to this embodiment, by dynamically changing the relationship between the plurality of receiving channels and the plurality of display channels, pieces of article information are dispersedly displayed on an arbitrary window of the display windows $W_1$ to $W_n$ in the display 508. Therefore, a display screen which can be easily seen by a recipient can be achieved.

According to this embodiment, for example, article information of a receiving channel allocated to the display window $W_1$ is moved to the display window $W_2$ by using the pointing device 509. Therefore, a display screen which can be more easily seen can be achieved.

According to this embodiment, since two display regions (e.g., display windows $W_1$ and $W_2$) in the display 508 can be integrated into one display region (e.g., display window $W_2$) by using the pointing device 509, pieces of article information which are dispersedly displayed can be integrated with each other, and a display area in the display 508 can be reduced.

Although the embodiment according to the present invention has been described above with reference to the accompanying drawings, a concrete example is not limited to the embodiment, and a change in design is included in the present invention without departing from the spirit and scope of the present invention. For example, in the embodiment described above, an information receiving program for realizing the functions of the client 500 may be recorded on a computer readable recording medium 1400 shown in FIG. 14, the information receiving program recorded on the recording medium 1400 may be loaded on a computer 1300 and executed to receive/display information.

Figure 14:
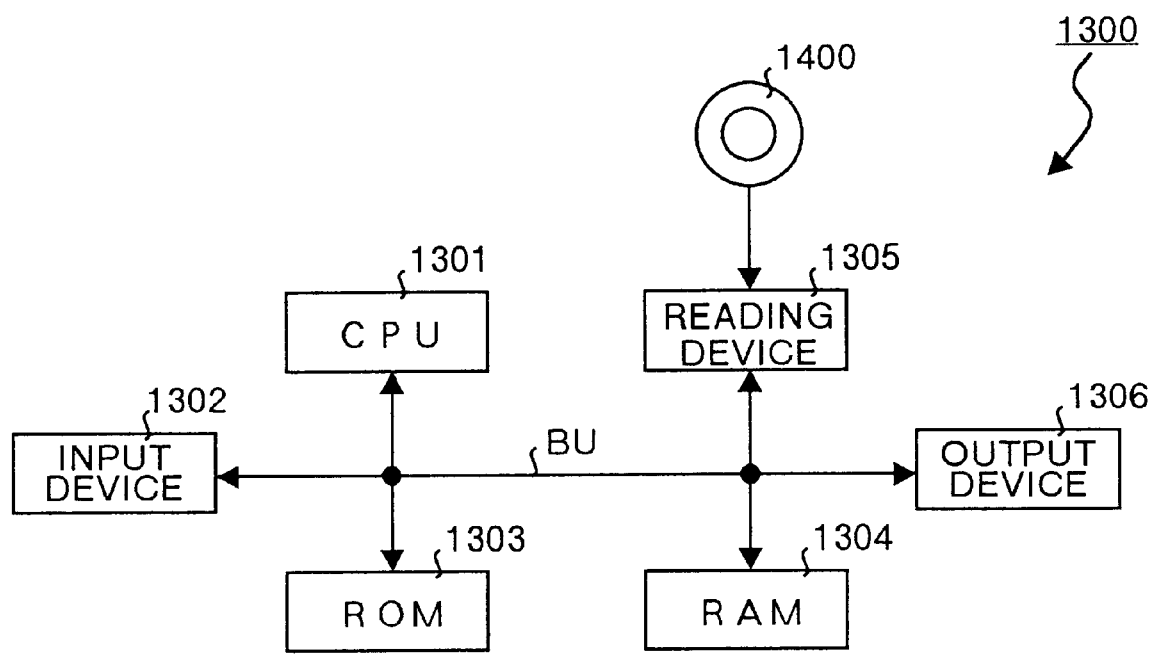
FIG. 14 is a block diagram showing a modification of the embodiment.

The computer 1300 shown in FIG. 14 is constituted by a CPU 1301 for executing the information receiving program, an input device 1302 such as a keyboard or a mouse, a ROM (Read Only Memory) 1303 for storing various data, a RAM (Random Access Memory) 1304 for storing an arithmetic operation parameter or the like, a reading device 1305 for reading the information receiving program from the recording medium 1400, an output device 1306 such as a display or a printer, and a bus BU for connecting these devices to each other.

The CPU 1301 loads the information receiving program recorded on the recording medium 1400 through the reading device 1305 and then execute information reception to perform the process of receiving the information described above. The recording medium 1400 includes not only a portable recording medium such as an optical disk, a floppy disk, or a hard disk but also a transmission medium such as a network which temporarily records or holds data.

As has been described above, according to one aspect of this invention, the receiving units for respectively receiving pieces of information having different attributes are provided, and the pieces of information received by these receiving units are displayed in one display region at once. Therefore, unlike the prior art, since a dedicated program need not be started for every attribute, the pieces of information having different attributes can be more reliably informed to the recipient advantageously.

According to another aspect of this invention, since the selection unit is provided to select or reject necessary information and unnecessary information for a recipient, necessary information mixed with unnecessary information can be prevented from being overlooked.

According to still another aspect of this invention, since the pieces of importance information are added to the pieces of document information, and document information having a high degree of importance is displayed in one display region, recipient's attention to the document information having a high degree of importance can be advantageously called.

According to still another aspect of this invention, since the pieces of attached information are added to the pieces of information to display not only ordinary information but also the detailed information, an advantage that correct information can be advantageously informed to a recipient.

According to still another aspect of this invention, since the allocation unit is arranged to allocate the pieces of information received by the receiving units to the plurality of display regions, and the pieces of information are dispersedly displayed in the plurality of display regions, unlike the prior art, a dedicated program need not be started for every attribute. Thus, the pieces of information having different attributes can be more reliably informed to a recipient, and a display screen which is easily seen by the recipient can be advantageously achieved by dispersedly displaying the pieces of information.

According to still another aspect of this invention, since reallocation related to the display regions is performed by the allocation unit, a display screen which is more easily seen by the recipient can be advantageously achieved.

According to still another aspect of this invention, since at least two display regions are integrated into one display region by the integration unit, the pieces of information which are dispersedly displayed can be integrated, and a display area in the display unit can be advantageously reduced.

According to still another aspect of this invention, since the pieces of information received in the receiving step are displayed in one display region at once, unlike the prior art, a dedicated program need not be started for every attribute. For this reason, the pieces of information having different attributes can be advantageously informed.

According to still another aspect of this invention, since the pieces of information received in the receiving step are allocated to the plurality of display regions, and the pieces of information are dispersedly displayed in the plurality of display regions in accordance with the allocation, unlike the prior art, a dedicated program need not be started for every attribute. Thus, the pieces of information having different attributes can be more reliably informed to a recipient, and a display screen which is easily seen by the recipient can be achieved by dispersedly displaying the pieces of information.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information receiving apparatus comprising:

a plurality of receiving units which receive pieces of information through a plurality of transmission channels, each of the pieces of information having a different attribute and being allocated to a different one of the plurality of transmission channels, each of the plurality of receiving units receiving one of the pieces of information through the corresponding one of the plurality of transmission channels;

a display unit which displays the pieces of information;

a display control unit which controls said display unit so as to display, in one display region of said display unit, the pieces of information received by said receiving units; and a selection unit which selects the information to be displayed of the pieces of information respectively received by said receiving units in accordance with a predetermined order of priority, wherein said display control unit displays the information selected by said selection unit in one display region of said display unit.

2. An information receiving apparatus comprising:

a plurality of receiving units which receive pieces of information through a plurality of transmission channels, each of the pieces of information having a different attribute and being allocated to a different one of the plurality of transmission channels, each of the plurality of receiving units receiving one of the pieces of information through the corresponding one of the plurality of transmission channels;

a display unit which displays the pieces of information; and a display control unit which controls said display unit so as to display, in one display region of said display unit, the pieces of information received by said receiving units wherein pieces of information respectively allocated to the plurality of transmission channels are a set of pieces of document information, pieces of importance information depending on the degrees of importance are added to the pieces of document information, and said display control unit controls said display unit to display the document information having a high degree of importance, on the basis of the importance information, in preference to the other pieces of document information in one region of said display unit.

3. An information receiving apparatus comprising:

a plurality of receiving units which receive pieces of information through a plurality of transmission channels, each of the pieces of information having a different attribute and being allocated to a different one of the plurality of transmission channels, each of the plurality of receiving units receiving one of the pieces of information through the corresponding one of the plurality of transmission channels;

a display unit which displays the pieces of information; and a display control unit which controls said display unit so as to display, in one display region of said display unit, the pieces of information received by said receiving units;

wherein pieces of attached information related to detailed information are added to the pieces of information, and the display control unit controls said display unit to display the pieces of information in the display region and displays the detailed information on the basis of the pieces of attached information.

4. An information receiving apparatus comprising:

a plurality of receiving units which receive pieces of information which are respectively allocated to a plurality of transmission channels and have different attributes in units of transmission channels;

a display unit having a plurality of display regions;

an allocation unit which allocates the pieces of information respectively received by said receiving units to a plurality of display regions of said display unit as desired;

and a display control unit which controls said display unit so as to dispersedly display the pieces of information in the display regions of said display unit in accordance with the allocation in said allocation unit.

5. The information receiving apparatus according to claim 4, wherein the allocation unit allocates information displayed in a certain display region to another display region when the pieces of information are dispersedly displayed in the plurality of display regions.

6. The information receiving apparatus according to claim 4, comprising an integration unit which combines at least two display regions into one display region when the pieces of information are dispersedly displayed in the plurality of display regions.

7. A computer readable recording medium on which an information receiving program for causing a computer to execute an information receiving method is recorded thereon, said information receiving method comprising the steps of:

receiving pieces of information which are respectively allocated to a plurality of transmission channels and have different attributes in units of transmission channels;

allocating the pieces of information received at the receiving step in a plurality of display regions of a display unit as desired; and dispersedly displaying the pieces of information in the plurality of display regions of said display unit in accordance with the allocation at the allocation step.

* * * * *

UNITED STATES PATENT AND TRADEMARK OFFICE
CERTIFICATE OF CORRECTION

PATENT NO.   : 6,691,152 B1
DATED        : February 10, 2004
INVENTOR(S)  : Moride et al.

It is certified that error appears in the above-identified patent and that said Letters Patent is hereby corrected as shown below:

Column 19,
Line 67, after "and" please delete "a".

Column 20,
Line 1, before "selection unit" please insert "a".

Signed and Sealed this

Sixth Day of July, 2004

JON W. DUDAS
*Acting Director of the United States Patent and Trademark Office*